United States Patent [19]

Fujita et al.

[11] 4,050,787
[45] Sept. 27, 1977

[54] ELECTROOPTIC DISPLAY DEVICE

[75] Inventors: Masanori Fujita, Matsudo; Sukenori Suzuki, Narashino, both of Japan

[73] Assignee: Kabushiki Kaisha Seikosha, Japan

[21] Appl. No.: 546,899

[22] Filed: Feb. 4, 1975

[30] Foreign Application Priority Data

Feb. 4, 1974  Japan .................................. 49-14274

[51] Int. Cl.$^2$ .............................................. G02F 1/16
[52] U.S. Cl. ............................................... 350/160 LC
[58] Field of Search ................................... 350/160 LC

[56] References Cited

U.S. PATENT DOCUMENTS

| | | | |
|---|---|---|---|
| 3,853,392 | 12/1974 | Fergason | 350/160 LC |
| 3,877,015 | 4/1975 | Kanazaki et al. | 350/160 LC X |
| 3,902,790 | 9/1975 | Hsieh et al. | 350/160 LC |

FOREIGN PATENT DOCUMENTS

| | | | |
|---|---|---|---|
| 2,058,104 | 5/1972 | Germany | 350/160 LC |

Primary Examiner—Edward S. Bauer
Assistant Examiner—Rolf Hille
Attorney, Agent, or Firm—Robert E. Burns; Emmanuel J. Lobato; Bruce L. Adams

[57] ABSTRACT

An electrooptic display device comprises two spacedapart electrode substrates with an interspace therebetween, and a substance which exhibits an electrooptic effect such as liquid crystal material hemetically sealed in the interspace. One one substrate are disposed a plurality of segment electrodes having an array of segment-lead electrodes extending therefrom, and a set of lead electrodes. On the other substrate are disposed a plurality of common electrodes at locations opposite respective ones of the segment electrodes and having extending therefrom common-lead electrodes electrically connected to predetermined ones of the lead electrodes, and a set of connecting electrodes electrically connected to predetermined ones of the segment-lead electrodes. The electrical connection of the electrodes is achieved by an electrically conductive adhesive applied at preselected connection sites between the electrodes.

3 Claims, 6 Drawing Figures

ELECTROOPTIC DISPLAY DEVICE

BACKGROUND OF THE INVENTION

This invention relates to a display device employing an electrooptic substance such as liquid crystal substance. More particularly, it makes wirings on an electrode substrate simple and accurate, and facilitates the manufacturing process.

It is well known that, in the electrooptic display device employing liquid crystal or the like material, the dynamic drive method is used for achieving the multi-digit indication of numerals etc.

The prior art has several disadvantages. The same segments need be electrically coupled. In this respect, when it is intended to lay wirings without any intersection on an identical plane, the wirings must extend through the interstices among the segments. On the other hand, in order that the indicated numeral may be easy to see, the interstices among the segments should desirably be made as small as possible. For these reasons, the lead wires must be very small in diameter. The lead wire accordingly has an excessively high resistance, so that the lowering of an applied voltage and the breaking of the wire are prone to occur. Besides, on account of the small interstice, the wire is apt to come into contact with the adjacent segment on the identical plane.

As prior-art techniques to eliminate the disadvantages, there have been known one in which the lead wires of all the segments are once led out of a cell and then interconnected outside the cell by other wires, and one in which insulating layers and conductive layers are alternately formed for the interconnections by the multilayer printing.

With these techniques, however, the multilayer printing and the soldering require very much time and labor. This undesirable and results in a low efficiency of production.

SUMMARY OF THE INVENTION

It is accordingly an object of this invention to provide an electrooptic display device in which the wirings are extremely simple and the wirings to an external circuit are extremely easy to make.

Another object of this invention is to provide an electrooptic display device in which the wiring job is extremely simple and the efficiency of production is raised owing to simple stages of work.

Still another object of this invention is to provide an electrooptic display device in which segment electrodes and common electrodes on electrode substrates can be bonded in a parallel state extraordinarily accurately and the electrodes to an external circuit can be laid extremely easily.

Yet another object of this invention is to provide an electrooptic display device which can perfectly prevent the electrodes from being short-circuited.

BRIEF DESCRIPTION OF THE DRAWING

The above and other objects and features of the present invention may be fully apprehended from the following detailed description when considered with reference to the accompanying drawing in which:

FIG. 2 is a plan view of the other electrode substrate, FIG. 3 is a plan view in the case where both the electrode substrates are joined together, FIG. 4 is a plan view showing the positions of a conductive adhesive, FIG. 5 is a plan view of a seal material, and FIG. 6 is a plan view showing the positions of the seal material and a nonconductive substance.

DETAILED DESCRIPTION

An embodiment of this invention will be described with reference to the drawings.

Figure 1:
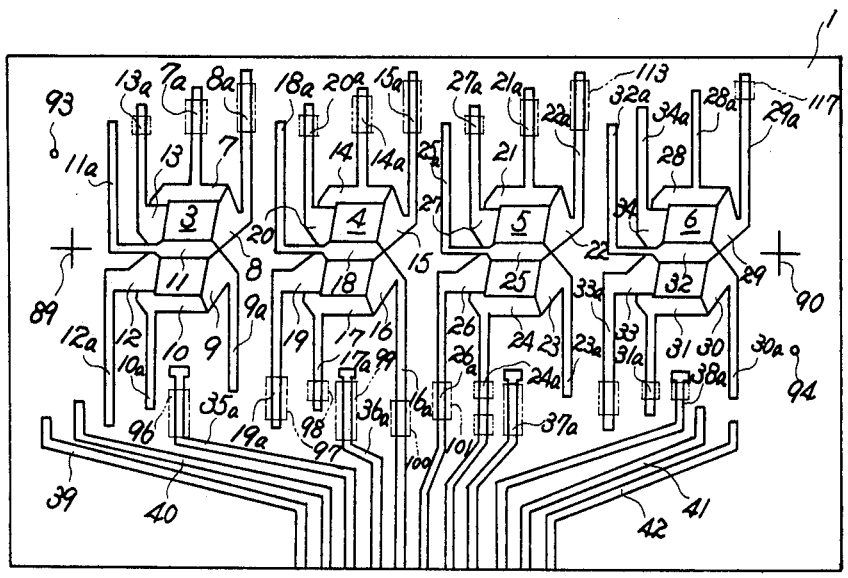
FIGS. 1 to 6 illustrate an embodiment of this invention, FIG. 1 of which is a plan view of one of two electrode substrates.

A panel type cell is composed of two electrode substrates 1 and 2, one 1 of which is shown in FIG. 1 and is made of nonconductive transparent glass. It is provided thereon with transparent thin-film electrodes 3, 4, 5 and 6 (four digits in the illustration) which are formed in such way that a thin film of indium oxide, tin oxide or the like is provided by the process of spraying or vacuum evaporation and that the thin film is etched. The respective electrodes are formed from seven segment electrodes, 7-13, 14-20, 21-27 and 28-34. The respective segment electrodes are formed with segment-lead electrodes 7a, 8a, . . . and 34a. The three 16a, 24a and 26a of the segment-lead electrodes are extended to an edge of the glass as shown at a lower part in FIG. 1. Provided below the electrodes 3-6 at the respective digits are lead electrodes 35a, 36a, 37a and 38a for connections with common electrodes 35, 36, 37 and 38 shown in FIG. 2 and to be stated later. Further, four lead electrodes 39, 40, 41 and 42 are provided, all of which are extended to the lower end of the substrate 1.

Figure 2:
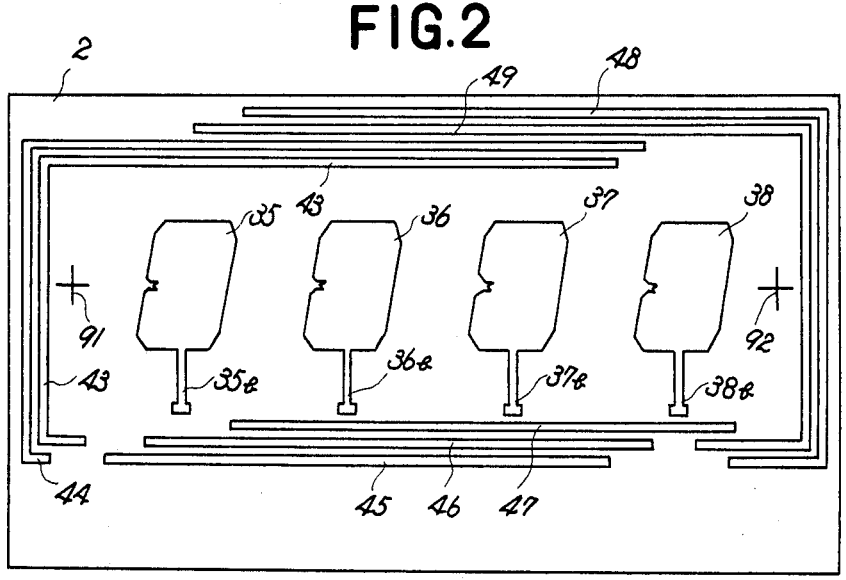

The other electrode substrate 2 is shown in FIG. 2 and is made of ceramics, glass or the like. It is provided with the common electrodes 35, 36, 37 and 38 in such positional relation that they oppose respectively to the transparent electrode 3, 4, 5 and 6 each consisting of the seven segment electrodes. The common electrodes 35-38 are constructed of a transparent electrode film, or an opaque electrode film of nickel, aluminum, silver, gold, platinum or the like. The electrodes are respectively provided with common-lead electrodes 35b, 36b, 37b and 38b, whose lower ends are to be respectively placed on the upper ends of the lead electrodes 35a, 36a, 37a, and 38a. Further, around the common electrodes 35-38, there are provided connecting electrodes 43, 44, 45, 46, 47, 48 and 49 which connect common ones of the segment lead electrodes 7a-34a of the respective segment electrodes 7-34 provided on the other electrode substrate 1. For example, the segment lead electrodes 8a, 15a, 22a and 29a of the respective indicating electrodes 8, 15, 22 and 29 are connected by the connecting electrode 48. The state of the interconnections is apparent from FIG. 3.

Figure 4:
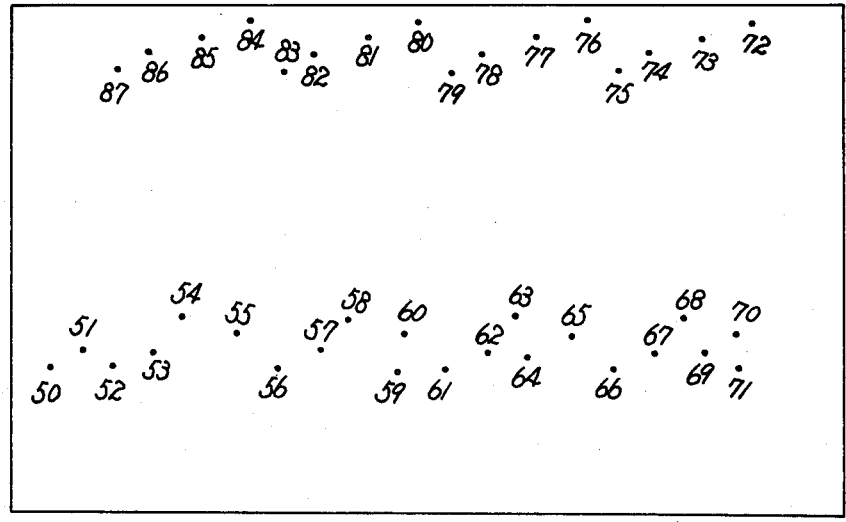

In this case, an electrically conductive adhesive is printed by the screen printing or any other suitable expedient at connecting portions 50-87 of all the segment-lead electrodes 7a-34a, lead electrodes 35a-38a and common-lead electrodes 35b-38b and electrodes 39-49. Only the places of the printed adhesive are shown in FIG. 4.

Figure 3:
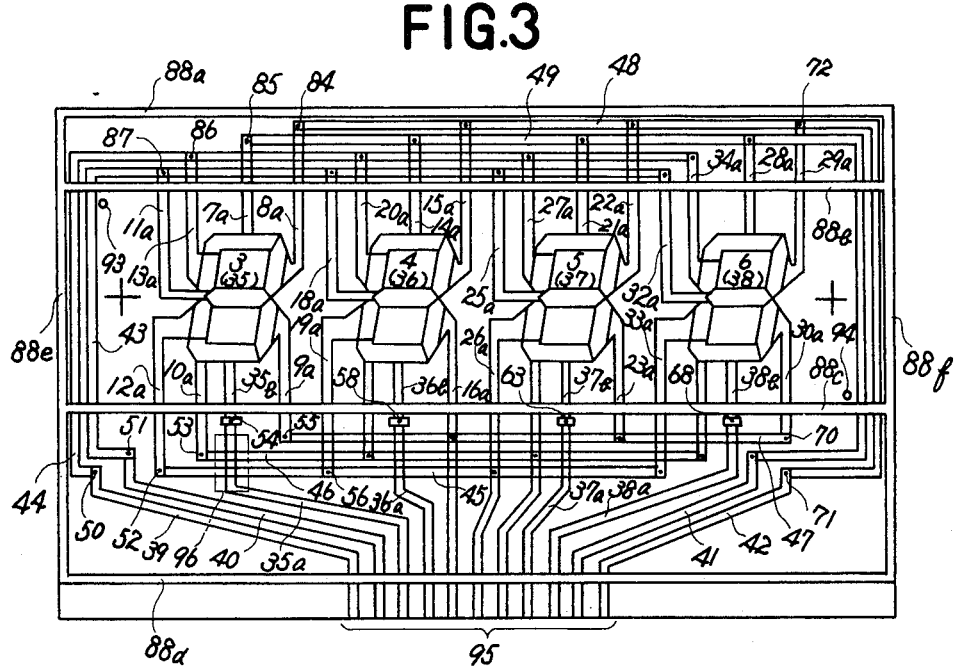

As shown in FIG. 3, a seal material 88 is stuck at predetermined positions of the electrode substrate 1 by manual application or the screen printing.

Figure 5:
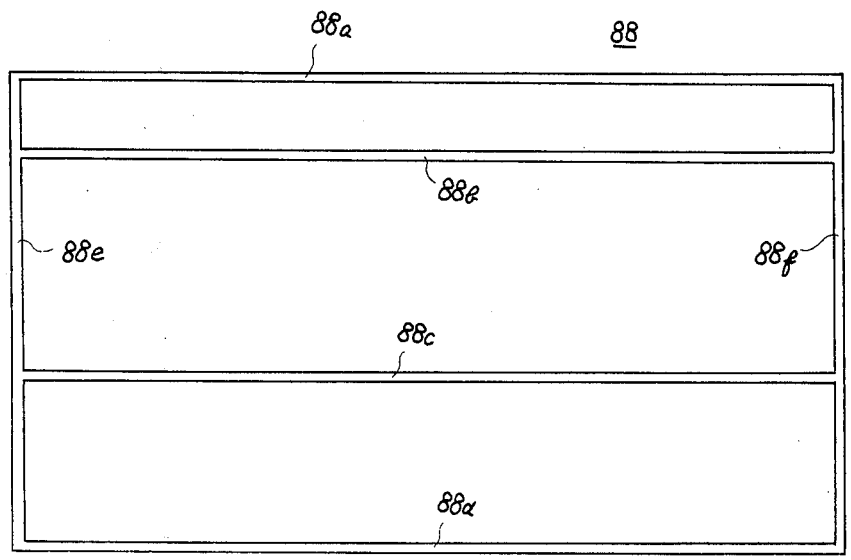
Figure 6:
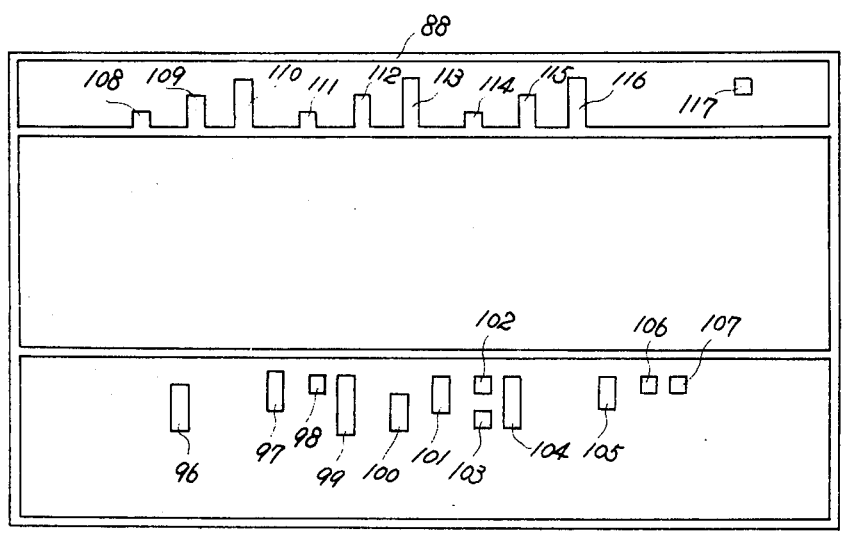

The shape of the seal material may satisfactorily consist of parts 88b, 88c, 88e and 88f which surround the electrodes. It is also desirable that. as illustrated in FIG. 5, parts 88a and 88d are additionally provided at positions of the peripheral edges of either of the electrode substrates so as to enclose the electrode portions.

The combination between the electrode substrates 1, 2 and the conductive adhesive 50-87 as well as the seal material 88 to be stuck by the printing, the application or the like is not restricted to the foregoing, but the seal material and the conductive adhesive may be stuck to the substrate 2.

It is an important requirement of this invention that the seal material 88 and the conductive binder 50-87 are comparatively close in the condition of thermocompression. In order to fulfill the requirement, there may be taken the measure in which a substance allowing the screen printing and having a high strength of adherence is selected beforehand as the seal material 88, an appropriate amount of metallic powder such as Ag reduced powder, Au powder, Pd/Ag powder and Ni powder is mixed into the seal material, and the resultant material is used as the conductive adhesive 50-87.

The thicknesses of the electrodes 3-6 and 35-38 and the electrodes 11a-33a, 35b-38b and 43-49 provided on both the electrode substrates 1 and 2 are approximately 100 to 3000 angstroms, while the spacing between the thin film electrodes 3-6 and the common electrodes 35-38 as set up by the seal material 88 is approximately 5 to 100 microns. Accordingly, even when the electrode substrates 1 and 2 are joined with both the electrodes opposing inwards, there is not the danger of the occurrence of a short-circuit in the electrodes.

As the producing process of this invention, the electrodes 3-6 and the electrodes are formed on the one electrode substrate 1 as illustrated in FIG. 1 by the method including the etching. The conductive adhesive 50-87 shown in FIG. 4 is stuck onto the resultant substrate and electrically adheres together certain ones of the elctrodes at preselected connection sites. Onto the other electrode substrate 2, the common electrodes 35-38 and the connecting electrodes 43-49 as shown in FIG. 2 are formed, and the seal material 88 shown in FIG. 5 is stuck.

Locating points 89, 90 and 91, 92 are respectively registered with the electrodes of both the electrode substrates 1 and 2 held inside, and the thermocompression bonding is carried out under the most suitable hardening condition. A substance having an electrooptic effect, such as liquid crystal, is injected through one of the injecting holes 93 and 94 in FIG. 1 into the interspace defined by the seal material 88b, 88c, 88e and 88f, and it is hermetically contained. In this way, the connection between the opposite electrodes and the sealing are performed by the thermocompression bonding at one step.

The device thus completed is shown in FIG. 3.

All the electrodes are coupled to a group of input terminals 95 on an identical plane of the one electrode substrate 1.

With the parts 88b, 88c, 88e and 88f as stated above, the seal material 88 suffices in order to hermetically contain the liquid crystal. When the electrode portions are also surrounded by the parts 88a and 88d, and in some cases, the interspaces corresponding to the electrode portions are made a vacuum or filled with a gas such as nitrogen gas, the seal material has the effect of preventing dust etc. from intruding. Furthermore, since the seal material 88 extends over a wider range, both the electrode substrate 1 and 2 can be joined at an extraordinarily uniform spacing.

The provision of the parts 88a and 88d for the seal material 88 is also effective in that uniform interspaces can be defined within both the substrates extraordinarily accurately when the electrode substrates 1 and 2 are registered for the thermocompression bonding.

The short-circuit between the electrodes is more perfectly prevented and the stability in this invention is increased in such way that, when the seal material 88 is printed onto the electrode substrate 1 as previously stated, and electrically nonconductive substance is simultaneously printed onto parts at which the electrodes intersect cubically with the electrodes of the opposing substrate 2, for example, a part 96 at which the lead electrode 35a and the connecting electrodes 45 and 46 intersect. Therefore, parts 96-117 at which the electrodes intersect are checked beforehand, and the nonconductive substance is printed in a positional relation illustrated in FIG. 7. The positions are concretely indicated in FIG. 1.

The nonconductive substance and the seal material need not be different substances, but they may be an identical substance.

As set forth above, according to this invention, the electrodes are extremely simple and the efficiency of production is high owing to the simple process of manufacture. Furthermore, both the electrodes can be bonded in the parallel state extremely precisely, and the job of writing to an external circuit is extremely easy. Besides, the short-circuit of the electrodes can be prefectly prevented.

We claim:

1. An electrooptic display device comprising:
   two spaced-apart and opposing electrode substrates which define therebetween an interspace hermetically containing therein a substance having an electrooptic effect;
   a plurality of segment electrodes disposed on one of said electrode substrates and having extending therefrom segmentlead electrodes;
   lead electrodes disposed on said one electrode substrate;
   common electrodes disposed on the other of said electrode substrates opposite respective ones of said segment electrodes and having extending therefrom common-lead electrodes electrically connected to predetermined ones of said lead electrodes; and
   connecting electrodes disposed on said other electrode substrate and electrically connected to predetermined ones of said segment-lead electrodes and said lead electrodes thereby commonly connecting them together.

2. An electrooptic display device as defined in claim 1; further including a seal material hermetically sealing both said electrode substrates together thereby preventing outflow of said substance having an electrooptic effect from said interspace.

3. An electrooptic display device as defined in claim 2; further including an electrically conductive adhesive electrically adhering together certain ones of said electrodes at preselected connection sites, said electrically conductive adhesive and said seal material having similar thermocompression bonding properties.

* * * * *